Dec. 23, 1969   E. L. DECKER   3,485,192
FAN FLOW CONTROLLER
Filed Nov. 16, 1967
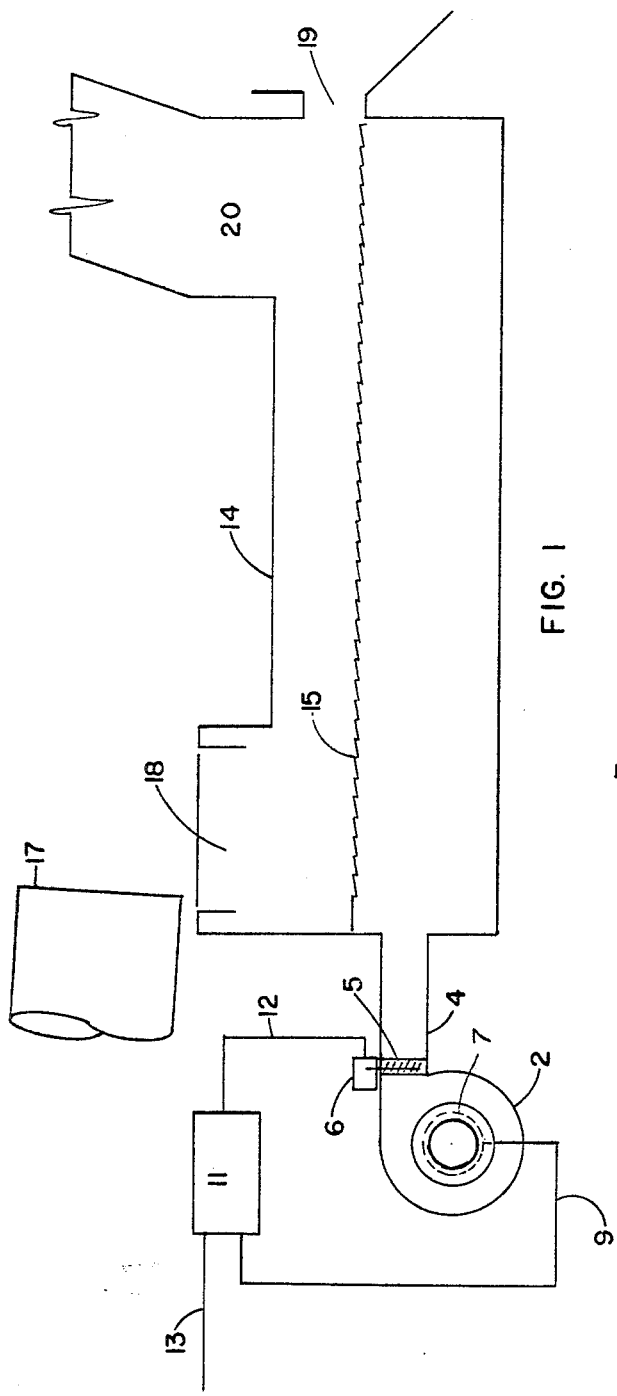
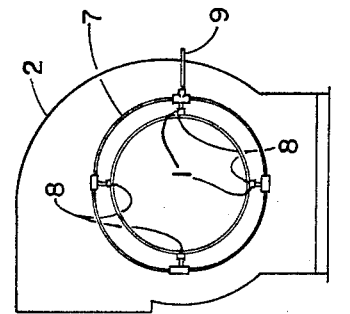
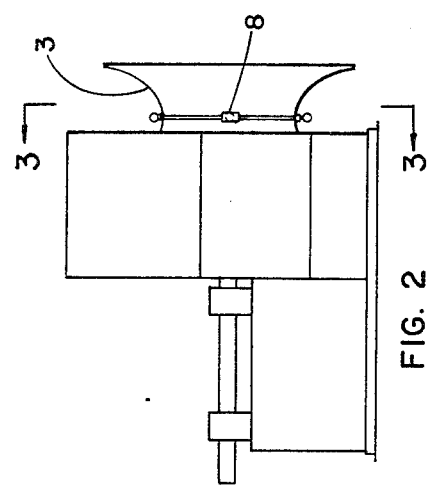
INVENTOR.
ERWIN LOUIS DECKER
BY United States Patent Office 3,485,192
Patented Dec. 23, 1969

3,485,192
FAN FLOW CONTROLLER
Erwin L. Decker, Catasauqua, Pa., assignor to
Fuller Company
Filed Nov. 16, 1967, Ser. No. 683,691
Int. Cl. F02d 27/00
U.S. Cl. 110—75          3 Claims

ABSTRACT OF THE DISCLOSURE

An apparatus for maintaining constant flow resistance through a gas flow system including a fan for delivering gas to the system and a flow sensing device attached to the fan. An automatic controller receives the flow measurement from the sensing device and transmits a corresponding signal to a damper operator for regulating a damper on the exhaust side of the fan to compensate for variations in flow resistance through the system.

BACKGROUND OF THE INVENTION

This invention relates to gas flow systems in which a fan supplies the gas flowing through the system. Such a gas flow system may comprise a system such as a cooler for extracting heat from clinker material received from a rotary kiln. In such a system, a fan communicates with the cooler for supplying cooling air for reducing the temperature of the clinker material passing through the cooler. The clinker material being fed into the cooler is extremely hot and it is necessary to maintain a sufficient supply of cooling gas through the cooler to reduce the temperature of the clinker material an appreciable amount and to protect the structural components of the cooler itself. A sufficient supply of gas is also essential for stabilizing the kiln operation. Usually, the cooler will have a grate type floor over which the clinker material is caused to travel. The cooling gas passes upward through the floor and hence through the clinker material thereby reducing the temprature of the material.

As the amount of material passing through the cooler varies due to surging in the kiln or change of capacity requirements to the kiln, the gas flow resistance through the material varies accordingly. If the change in resistance to flow cannot be compensated for, an increase in material depth in the cooler causes an increase in gas flow resistance, resulting in a corresponding decrease in gas flow through the cooler. The decrease in gas flow will of course cause an overheating within the cooler with resultant failure or damage to the cooler and a reduction in the operating efficiency of the kiln.

Another gas flow system of the general type contemplated herein could be a dust collecting system wherein a fan supplies the gas flow through the system, dust from the gas being deposited on a filter media as the gas passes therethrough. As the dust deposits on the filter media increases, flow resistance increases resulting in reduced efficiency.

It is therefore necessary to provide means to compensate for the aforementioned changes in gas flow resistance. This may be accomplished by maintaining a substantially constant total system resistance. Usually an oversized fan is employed and a damper is then placed on the exhaust side of the fan and the damper is set at some predetermined opening depending on some average resistance in the system. The damper can be manually adjusted to compensate for unusual changes in system loading.

Means have also been employed in an attempt to automatically regulate the damper in response to flow changes, however, these prior means have proven expensive, require considerable extra space, produce excessive pressure drops resulting in increased power requirements, are susceptible to clogging from dust in the gas and, therefore, greatly reducing the degree of reliability.

SUMMARY

It is the object of the present invention to provide an apparatus for use in a gas flow system which is capable of maintaining a constant system resistance and thereby maintain a constant gas flow through the system.

It is also an object to accomplish the foregoing results in an economical manner with an apparatus requiring a minimum of space, and which is not susceptible to a high degree of dust contamination thereby having a high degree of reliability.

The invention will be discussed in reference to one specific type of system, it being understood, however, that this is merely for ease of explanation since the invention may be employed in many types of gas flow systems.

The invention consists of a fan for supplying gas flow through a system. The fan has a flow sensing means attached thereto for measuring changes in the amount of flow into the fan. The flow measurement is transmitted through a suitable control mechanism to a controller which regulates a damper on the exhause side of the fan.

The controller is preset to maintain the damper in a substantially closed position when there is no material in the system. As material is fed to the systems the gas flow resistance in the system increases, thereby reducing the gas flow rate. This reduction in gas flow rate is sensed by the flow sensing means and transmitted through the control mechanism to the damper controller. The controller will automatically open the damper to compensate for the flow resistance through the material and thereby maintain a substantially constant system flow resistance.

The damper is essentially a built-in automatically controlled variable resistance which is added to the system resistance caused by material in the system to establish a total system resistance. As the flow resistance caused by material increases, the variable resistance is automatically decreased a like amount to maintain the total system resistance at its predetermined level.

In the embodiment depicted in the drawings, the variable resistance is in the form of a louvered type damper, however, it could also be a flap valve or an atmospheric bleed valve.

In the case of a system such as the one depicted, the total system resistance could also be maintained by varying the speed of the vibrating cooler grates in response to the flow sensing device thus varying the speed of the material through the cooler. This would regulate the depth of material on the grate and maintain a constant gas flow resistance in the system.

A fan with a variable speed motor could also be employed and the speed of the fan could be varied in response to changes in flow through the system.

BRIEF DESCRIPTION OF DRAWINGS

FIGURE 1 is a schematic view of a gas flow system incorporating the invention;

FIGURE 2 is a view of the fan employed in the invention showing a side view of the inlet cone;

FIGURE 3 is a view taken along line 3—3 of FIGURE 2.

DESCRIPTION OF PREFERRED EMBODIMENT

A fan 2 has an inlet cone 3 connected to its intake side for delivering air to the fan blades (not shown). The fan exhausts into a conduit 4 having a louvered damper 5 mounted therein. The damper 5 is connected to a damper operator 6 which automatically regulates the damper 5.

A piezometer tube 7 is connected around the outside of the inlet cone 3. The inlet cone 3 has a plurality of ports 8 through the wall of the inlet cone and which are spaced around the circumference thereof. A plurality of tube connectors 1 connect the ports 8 with the piezometer tube 7 to provide communication between the piezometer tube 7 and a plurality of points around the inside wall of the inlet cone 3. The piezometer tube 7 is further connected to a conduit 9 which communicates with a pneumatic controller 11. The controller communicates via a conduit 12 with the damper operator 6. Primary operating gas is supplied to the controller 11 via a gas supply conduit 13.

The exhaust conduit 4 delivers gas to a material cooler 14 having a reciprocating grate section 15. Material is fed to the cooler 14 from some material source 17 such as a rotary kiln. The material enters the cooler through a material feed port 18, moves along the reciprocating grate 15 and discharges from the cooler through the material discharge port 19. Cooling gas entering the cooler through the conduit 4 is exhausted from the cooler through the gas exhaust means 20.

Cooling gas is taken in through the fan inlet cone 3, passes through the fan 2 and damper 5 and then through the conduit 4 to the cooler 14. The cooling gas enters the cooler on the underneath side of the grate section 15 and passes up through the grate section to cool material deposited thereon, the gas then being exhausted from the cooler through the gas exhaust means 20.

Gas flow through the inlet cone 3 produces a pressure in the piezometer tube 7. Since the piezometer tube 7 communicates with the interior of the inlet cone 3 through a plurality of pressure ports 8, the resulting pressure in the piezometer tube 7 and conduit 9 represents the average flow through the inlet cone at any given time. Variations in the average gas flow through the inlet cone 3 will be reflected as a corresponding increase or decrease in the pressure within the piezometer tube 7. These changes in pressure are transmitted to the controller 11 via the conduit 9. The controller 11 measures the change in pressure and transmit the change in pressure to the damper operator 6 which in turn regulates the damper 5 in accordance with the pressure differential. The controller 11 may convert the pressure differential to an electrical impulse which is transmitted to an electrically operated damper operator or the pressure differential may be transmitted in the form of a pneumatic signal to a pneumatically operated damper operator either of which is well known in the art.

The damper operator is preset to maintain the damper in a predetermined position for producing the desired system flow resistance when no material is in the cooler. As material is fed into the cooler this causes additional flow resistance which is reflected in reduced gas flow through the inlet cone 3. The corresponding change in pressure in the piezometer tube 7 is transmitted to the controller 11 which signals the damper operator 6 to open the damper 5 an appropriate amount. Opening the damper 5 reduces the gas flow resistance an amount sufficient to compensate for the increased flow resistance caused by the material in the cooler.

It will thus be seen that changes in gas flow resistance caused by increases or decreases in the amount of material in the cooler will be compensated for by automatically controlling the damper 5 and thereby maintaining a substantially constant system gas flow resistance. The fan must of course be of sufficient size and capacity to maintain the required gas flow through a maximum loaded cooler with the damper full open.

It is to be understood that the foregoing is merely a preferred embodiment of the invention as the basic inventive concept may be employed on various types of gas flow systems where it is desired to maintain a constant gas flow resistance through the system.

I claim:

1. An apparatus for maintaining a substantially constant gas flow resistance in a gas flow system comprising a fan having a gas inlet and a gas outlet, an inlet cone connected to the gas inlet, a piezometer tube attached around the outside of the inlet cone, a plurality of ports spaced circumferentially around the inlet cone and extending through the wall thereof communicate with the piezometer tube through a plurality of tube connectors providing communication between the piezometer tube and a plurality of points around the inside of the inlet cone for accurately sensing changes in gas flow through the inlet cone, a conduit connecting the piezometer tube with a controller for communicating indications of changes in gas flow from the piezometer tube to the controller, a variable flow resistance means mounted in the gas outlet and operatively connected with the controller, said controller automatically varying the flow resistance means in response to changes in gas flow sensed by the piezometer tube.

2. The apparatus of claim 1 wherein the variable flow resistance means comprises a louvered damper having a damper operator operatively connected thereto, said damper operator communicating with said controller for automatically adjusting the louvered damper in response to signals from the controller.

3. A gas flow system comprising a material cooler having a grate section, a material feed port for delivering material to the grate section for cooling and a material discharge port for discharging cooled material, a fan having a gas outlet in communication with said cooler for supplying cooling gas to the underside of said grate section which flows upward therethrough to cool material deposited on the grate section, said fan having a gas inlet with an inlet cone connected thereto, a piezometer tube attached around the ouside of the inlet cone, a plurality of ports spaced circumferentially around the inlet cone and extending through the wall thereof communicate with the piezometer tube through a plurality of the connectors providing communication between the piezometer tube and a plurality of points around the inside of the inlet cone for accurately sensing changes in gas flow through the system, a conduit connecting the piezometer tube with a controller for communicating indications of changes in gas flow from the piezometer tube to the controller, a variable damper mounted in the gas outlet with a damper operator operatively connected thereto, said damper operator communicating with said controller for automatically adjusting said damper in response to signals from the controller to maintain a constant flow resistance in the system.

References Cited

UNITED STATES PATENTS

| | | | |
|---|---|---|---|
| 1,713,833 | 5/1929 | Kochendorfer | 103—21 X |
| 1,893,200 | 1/1933 | Dolbey et al. | 103—21 X |
| 1,940,921 | 12/1933 | Smith | 73—205 |
| 1,961,791 | 6/1934 | Roth et al. | 103—21 X |
| 1,956,829 | 5/1934 | Frank | 230—114 |
| 2,088,023 | 7/1937 | Baer et al. | 230—114 |
| 2,920,584 | 1/1960 | Crise | 230—114 |
| 3,047,210 | 7/1962 | Best | 230—115 |

WILLIAM L. FREEH, Primary Examiner

U.S. Cl. X.R.

230—23, 114